US011953885B2

(12) United States Patent
Kiefer et al.

(10) Patent No.: US 11,953,885 B2
(45) Date of Patent: Apr. 9, 2024

(54) METHOD FOR DISPLAYING WORKPIECE-ILLUSTRATIONS FOR SUPPORTING A SORTING PROCESS

(71) Applicants: TRUMPF Werkzeugmaschinen GmbH + Co. KG, Ditzingen (DE); Fraunhofer-Gesellschaft zur Foerderung der angewandten Forschung E.V., Munich (DE)

(72) Inventors: Manuel Kiefer, Sinsheim (DE); Willi Poenitz, Leonberg (DE); Dominik Bitto, Muenchingen (DE); Marc Teschner, Stuttgart (DE)

(73) Assignee: TRUMPF WERKZEUGMASCHINEN SE + CO. KG, Ditzingen (DE)

( * ) Notice: Subject to any disclaimer, the term of this patent is extended or adjusted under 35 U.S.C. 154(b) by 451 days.

(21) Appl. No.: 17/233,604

(22) Filed: Apr. 19, 2021

(65) Prior Publication Data

US 2021/0240169 A1 Aug. 5, 2021

Related U.S. Application Data

(63) Continuation of application No. PCT/EP2019/078024, filed on Oct. 16, 2019.

(30) Foreign Application Priority Data

Oct. 19, 2018 (DE) ..................... 10 2018 126 050.4

(51) Int. Cl.
G05B 19/418 (2006.01)
(52) U.S. Cl.
CPC ............... *G05B 19/41815* (2013.01); *G05B 2219/39102* (2013.01)

(58) Field of Classification Search
None
See application file for complete search history.

(56) References Cited

U.S. PATENT DOCUMENTS

| 2019/0240703 A1 | 8/2019 | Kiefer et al. |
| 2019/0243343 A1 | 8/2019 | Denecke et al. |

(Continued)

FOREIGN PATENT DOCUMENTS

| DE | 102016120132 A1 | 4/2018 |
| DE | 102017107357 A1 | 4/2018 |

(Continued)

*Primary Examiner* — Ryan A Jarrett
(74) *Attorney, Agent, or Firm* — LEYDIG, VOIT & MAYER, LTD.

(57) ABSTRACT

A method for displaying a sequence of workpiece-illustrations and/or order information for supporting a sorting process during manufacturing of workpieces with a manufacturing system includes transporting manufactured workpieces with the conveyor system to the sorting point according to a sequence and arrangement specified by the processing plan. The method further includes receiving, in the processor of the display unit, workpiece image data and/or order data provided by the machine tool control system for the workpieces transported to the sorting point. The method additionally includes displaying the workpiece image data and/or the order data on the monitor of the display unit in a sequence and/or an arrangement such that the sequence and/or the arrangement of the workpiece image data and/or the order data corresponds to the sequence and/or the arrangement of the workpieces transported from the conveyor system to the sorting point.

20 Claims, 3 Drawing Sheets

(56) References Cited

U.S. PATENT DOCUMENTS

| | | |
|---|---|---|
| 2019/0243344 A1 | 8/2019 | Bauer et al. |
| 2020/0218237 A1 | 7/2020 | Kiefer et al. |

FOREIGN PATENT DOCUMENTS

| | | |
|---|---|---|
| EP | 1524063 A1 | 4/2005 |
| JP | H 04091882 A | 3/1992 |
| WO | WO 2018073419 A1 | 4/2018 |
| WO | WO 2020078683 A1 | 4/2020 |

METHOD FOR DISPLAYING WORKPIECE-ILLUSTRATIONS FOR SUPPORTING A SORTING PROCESS

CROSS-REFERENCE TO PRIOR APPLICATIONS

This application is a continuation of International Patent Application No. PCT/EP2019/078024, filed on Oct. 16, 2019, which claims priority to German Patent Application No. DE 10 2018 126 050.4, filed on Oct. 19, 2018. The entire disclosure of both applications is hereby incorporated by reference herein.

FIELD

The present invention relates to a method for displaying a sequence of workpiece-illustrations and/or order information during manufacturing of workpieces, in particular for supporting a sorting process of workpieces manufactured with a flatbed machine tool. Furthermore, the invention relates to a manufacturing system for manufacturing workpieces, in particular sheet metal workpieces.

BACKGROUND

In the industrial metal and/or sheet metal processing, exemplary for the metalworking industry, many parts of different sizes and quantities are often generated together and fed to different processing steps according to the respective order. For example, workpieces are separated with a machine tool according to a cutting plan in different shapes and quantities from a flat material that is, for example, in a sheet form. For example, the workpieces are cut out of the flat material with a laser. Such machine tools output the processed workpieces, e.g., the laser-cut material, usually arranged next to each other, for example, on a pallet or a conveyor belt, while keeping the sheet form. From there, the workpieces are sorted and provided to subsequent processing steps.

EP 1 524 063 A1 discloses a method for marking workpieces in which a plate is cut or punched. To facilitate the sorting of the workpieces, a projector projects different optical markings onto the cut or punched workpieces.

SUMMARY

In an embodiment, the present invention provides a method for displaying a sequence of workpiece-illustrations and/or order information for supporting a sorting process during manufacturing of workpieces with a manufacturing system. The manufacturing system includes a machine tool control system in which workpiece image data and/or order data associated with each of the workpieces are stored as part of a machine-readable processing plan. For each workpiece, the workpiece image data include an illustration based on geometry data of the workpieces to be manufactured, and the order data include characteristic data of a manufacturing order associated with the workpiece. The manufacturing system further includes a flatbed machine tool with which the workpieces are manufactured from a plate-shaped starting material according to the machine-readable processing plan, and a conveyor system that transports the workpieces as cut material to a sorting point for sorting the workpieces. The cut material is conveyed in a plate-like arrangement by the conveyor system. The manufacturing system further includes a display unit with a processor for receiving data to be output on a monitor of the display unit. The monitor is arranged in an area of the conveyor system. The method includes transporting manufactured workpieces with the conveyor system to the sorting point according to a sequence and arrangement specified by the processing plan and receiving, in the processor of the display unit, workpiece image data and/or order data provided by the machine tool control system for the workpieces transported to the sorting point. The method further includes displaying the workpiece image data and/or the order data on the monitor of the display unit in a sequence and/or an arrangement such that the sequence and/or the arrangement of the workpiece image data and/or the order data corresponds to the sequence and/or the arrangement of the workpieces transported from the conveyor system to the sorting point.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

An aspect of the present disclosure is based on further simplifying the handling during sorting and assigning of workpieces for a machine operator, as well as making the handling more ergonomic, and enable a more targeted and faster assignment of the workpieces.

A method is provided for displaying a sequence of workpiece-illustrations and/or order information for supporting a sorting process during manufacturing of workpieces with a flatbed machine tool and by a manufacturing system for manufacturing workpieces.

An aspect of the concepts disclosed herein relates to a method for displaying a sequence of workpiece-illustrations and/or (respectively and optionally) order information for supporting a sorting process during manufacturing of workpieces, in particular sheet metal components, with a manufacturing system. Thereby, the manufacturing system has a machine tool control system in which workpiece image data and/or order data associated with each of the workpieces are stored as part of a machine-readable processing plan, wherein the workpiece image data include, for each workpiece, an illustration based on geometry data of the workpieces to be manufactured, and the order data include characteristic data of a manufacturing order associated with the workpiece. The manufacturing system further includes a flatbed machine tool with which the workpieces can be manufactured from a plate-shaped starting material according to the machine-readable processing plan, and a conveyor system that transports the workpieces as cut material to a sorting point for sorting the workpieces. Thereby, the cut material is arranged in the form of a plate when it is conveyed by the conveyor system. The manufacturing system further includes a display unit with a processor for receiving data to be output on a monitor of the display unit, wherein the monitor is arranged in an area of the conveyor system, in particular near the sorting point. The method includes the following steps: transporting manufactured workpieces with the conveyor system to the sorting point according to a sequence and arrangement specified by the processing plan; receiving, in the processor of the display unit, workpiece image data and/or order data provided by the machine tool control system for the workpieces being transported to the sorting point; and displaying the workpiece image data and/or the order data on the monitor of the display unit in a sequence and optionally an arrangement such that the sequence and optionally the arrangement of the workpiece image data and/or the order data corresponds to the sequence and optionally the arrangement of the workpieces transported from the conveyor system to the sorting point.

In a further aspect, a manufacturing system for manufacturing workpieces, in particular sheet metal components, includes a machine tool control system in which workpiece image data and/or (respectively and optionally) order data associated with each of the workpieces to be manufactured are stored as part of a machine-readable processing plan, wherein for each workpiece the workpiece image data includes a workpiece-illustration based on planning data of the workpieces and the order data includes characteristic data of a manufacturing order associated with the workpiece. The manufacturing system further includes a flatbed machine tool with which the workpieces are manufactured from a plate-shaped starting material according to the machine-readable processing plan, a conveyor that transports the workpieces to a sorting point as cut material for sorting the workpieces, the cut material being conveyed in a plate-shaped arrangement by the conveyor system, and a display unit with a processor for receiving data to be output on a monitor of the display unit. Here, the monitor is arranged to be visible from the sorting point, and the processor is configured to receive workpiece image data and/or order data provided by the machine tool control system for the workpieces being transported to the sorting point. The machine tool control system is configured to control the monitor in accordance with the method described above such that the workpiece image data and/or the order data are displayed on the monitor in a sequence and arrangement such that the sequence and optionally the arrangement of the workpiece image data and/or order data corresponds to the sequence and optionally the arrangement of the workpieces transported by the conveyor system to the sorting point.

In some embodiments, the monitor is arranged in the region of the conveyor, particu-larly above a conveyor belt, and/or in the region of the sorting point. For example, the monitor may extend across nearly the entire width of the conveyor belt or may include one or more small screens below a reversal point of the conveyor belt in the area of the sorting point. As an alternative or additional monitor, virtual reality glasses or a head-up display system can be used.

Herein, workpiece-illustrations are illustrations that are based on workpiece image data and, in particular, based on geometry data of the workpieces to be manufactured; whether in the form of a 2D or 3D illustration of a data set of a workpiece, a schematic drawing, or a photograph. In some embodiments of the method, workpiece image data may be displayed on the monitor as a monitor image that includes (or highlights) complete or only partial workpiece-illustrations of only those workpieces that are in an area that can be sorted by a worker, for example, in a transverse strip of the conveyor belt in the area of a conveyor belt reversal. For example, the workpieces positioned for sorting at the sorting point can be determined taking into account a cutting plan stored in the processing plan that determines the arrangement of manufactured workpieces in the plate-shaped starting material, in particular taking into account relative positions of the workpieces within the arrangement of manufactured workpieces, and/or taking into account a feed value of a conveyor belt of the conveyor system.

The workpiece image data may be displayed with an orientation and/or at a position along a transverse direction of a conveyor belt of the conveyor system as workpiece-illustrations, wherein the orientation and/or position of one of the workpiece-illustrations is determined taking into account the processing plan and/or taking into account a transport path provided by the conveyor system for the sorting point.

In a further step, when the conveyor system is activated to assume a new feed position of a conveyor belt of the conveyor system so that further workpieces are transported to the sorting point, those workpieces, which were transported to the sorting point at the previously assumed feed position, can be automatically booked as having been sorted from the conveyor belt. Activation of the conveyor to assume the new feed position can be triggered automatically, in particular by a delayed release of a light barrier at the end of the conveyor belt, for example. Alternatively, it can be performed manually by a worker.

In further steps, a verification of automated bookings of picked parts can be performed in the machine tool control system by image acquisition of the picked parts and/or a residual grid or residual grid section, or user-controlled verification of automated bookings of picked parts in the machine tool control system can be performed. In particular, it can be rec-ognized in this way that all workpieces in the area of the sorting point have been sorted, and a control of the conveyor system in order to transport further workpieces to the sorting point can be triggered.

In further steps, groups of workpieces to be sorted can be generated according to the processing plan, wherein a residual grid section is associated to the workpieces of a group to be sorted and the workpieces of a group to be sorted are arranged in the residual grid section. Successive residual grid sections can each be separated from one another by a subdivision cut, in particular made by the cutting unit. Accordingly, the workpieces of a group can be transported to the sorting point with a common feed position of a conveyor belt of the conveyor system, workpiece image data and/or order data for the workpieces of the group, which was last transported to the sorting point, can be received and processed by the processor, and the workpiece image data and/or order data of the workpieces of the group, which was last transported to the sorting point, can be displayed on the monitor. In this regard, the residual grid section of a group may have a leading edge defining the feed position of a conveyor belt of the conveyor system for positioning the group at the sorting point. Accordingly, the conveyor belt of the conveyor system can be moved until, for example, a sensor such as a light barrier detects that the leading edge of a group has assumed a predetermined conveying position.

The concepts described herein relate generally to methods that make the sorting of workpieces and their assignment to order-specific deposit locations and/or subsequent processing steps fast and efficient. In particular, the method enables timely sorting with a high speed and efficiency, which in particular can meet the machine speed during the manufacturing of the workpieces, because the illustration of the information designed according to the invention takes into account the physical conditions of human perception and reception of information. In this context, the method is directed in particular at improving the operator's perception of the displayed information in a certain way or making it expedient. This can enable efficient sorting at a correspondingly high machine speed during manufacturing in the first place.

The concepts described herein have, for example, the advantages that error-prone image processing can be avoided and that part displacement or covering has no influence on the support of the worker. The process can be implemented more robustly in a wide variety of manufacturing environments and is not affected by lighting conditions or the contamination situation. It also allows a more ergonomic approach for the operator, who can quickly and easily design a favorable procedure for sorting individual workpieces in view of the workpieces awaiting sorting.

Herein, concepts are disclosed that allow at least partly to improve aspects of the prior art. In particular, additional features and their usefulness result from the following description of embodiments on the basis of the drawings.

Aspects described herein are partly based on making a sorting process of sheet metal pieces more efficient with the display of workpiece-specific information (such as subsequent workstation, order data, . . . ), as one avoids the time-consuming and error-prone inspection of accompanying documents of the underlying orders.

When supplying workpieces on a conveyor belt, for a stationary conveyor belt, the sortable selection of workpieces, as it is available to the worker at a workstation set up for sorting (sorting point), is limited by the reach and access possibilities of a worker to workpieces to be sorted. Accordingly, it is proposed to display the information required at that mo-ment only for these few workpieces on a display device in the vicinity. In other words, the displaying of information is also limited to these few workpieces having a local reference to the reach. The workpieces that are within reach of the operator at the sorting point are determined on the basis of sheet data and using information about the feed of the conveyor belt. For a partial automation, a booking of sorted workpieces can also be proposed or performed on the basis of the belt feed or by integrating other technology such as hand tracking.

In contrast to the projection of information onto the workpieces disclosed in EP 1 524 063 A1 mentioned at the beginning, the methods mentioned herein are independent of the size or material properties of the workpieces, which could prevent a projection.

Thus, in addition to the output of workpieces generated by a 2D laser cutting machine, information devices and input devices can be provided and used accordingly for image output. For manufacturing, a large number of differently shaped workpieces assigned to different orders are cut from a metal sheet using a 2D laser cutting machine, for example. For example, the cut material is transferred to a conveyor belt using a transfer system, and fed to a worker waiting at the sorting point for sorting. The conveyor belt moves the cut sheets towards the worker at an ergonomic working height and stops as soon as the leading edge of the sheet has reached the end of the conveyor belt (the return area of the circulating conveyor belt).

Based on the known workpieces within the sheets, the geometries of the foremost workpieces accessible to the worker and information helpful for sorting are now automatically determined. These workpieces, which can be picked next, are displayed on a monitor in the rotational position given in the sheet and possibly the position along the width of the belt. The display can be made, e.g., on a large screen above the conveyor belt, on several small screens, which are distributed below or at the end of the circulation area of the conveyor belt over the complete width, or also otherwise (VR glasses, head-up display, . . . ).

After the frontmost workpieces have been picked, the conveyor belt continues to cycle automatically or manually. The sorted workpieces are booked as removed by the operator or automatically by the system. Furthermore, missing or damaged workpieces can be booked by the worker. This interaction can be done, e.g., by touch input on a monitor displaying the workpieces, buttons, or gesture control. For example, automatic booking can incorporate motion tracking of a hand of the sorting worker. For example, using hand tracking one can detect which workpieces have actually been picked, so that only those workpieces are automatically booked. Further methods for assisting a worker during sorting are disclosed in DE 20 2016 120131 A1 and can be integrated in a correspondingly adapted manner. Interaction of the worker thus takes place, for example, only in the event of a deviation from the standard process (in this case, the sorting of good parts that meet the requirements for the workpieces). In the normal case, the worker can sort undisturbed by, for example, booking entries or he can perform the booking in a simple manner.

Accordingly, a check of the actual picking of the workpieces based on image processing or other visual means is not necessary, because this cannot be implemented in a wide variety of working environments, or can only be implemented in an error-prone manner. Er-rors can be caused, for example, by an unfavorable support (structure or material of the conveyor belt), process-related overlapping of workpieces and residual grids, undefined lighting conditions, etc.

According to the concepts disclosed herein, it is possible to display information on the manufacturing process in a timely manner and in connection with a produced workpiece, wherein the presentation of, for example, image content takes into account the physical conditions of human perception and reception of information. In particular, the illustration of information aims at making it possible for the machine operator to perceive the displayed information in a certain way and, moreover, shape the perception functionally.

The following describes, in connection with FIGS. 1 through 4C, a sorting workstation of a manufacturing system in which the concepts disclosed herein are used to assist in the sorting of cut workpieces.

Figure 1:
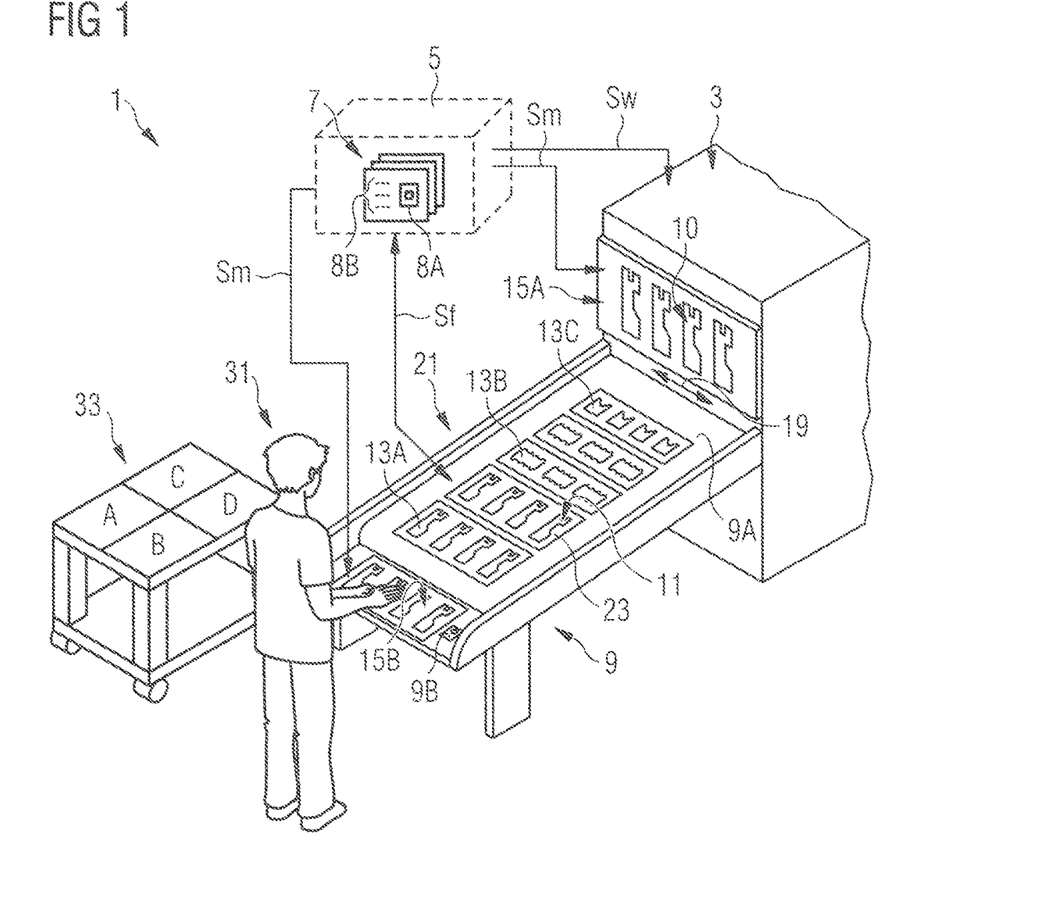
FIG. 1 is a representation of an exemplary picking station of a flatbed machine tool to illustrate a sorting process.

FIG. 1 shows a representation of an exemplary sorting workstation of a manufacturing system 1, in which workpieces are produced by a flatbed machine tool 3. The flatbed machine tool 3 is, for example, a laser cutting machine that uses a laser beam to cut out workpieces from a flat material (also referred to herein as a sheet) in two-dimensional shapes that can be set essentially in an arbitrary manner. For this purpose, the flat material is stored in the machine tool, for example, on a pallet over which a laser cutting head can be moved in such a way that a laser beam emerging from the laser cutting head is guided along the desired cutting contours. The movement of the laser cutting head is controlled by a machine tool control system 5. A control signal Sw for the machine tool is schematically indicated in FIG. 1. In the machine tool control system 5, the cutting contours are given in form of a digital processing plan 7. In the processing plan, the geometries of the workpieces to be cut, i.e., in particular the (outer and inner) contours of the workpieces to be cut, are stored in a cutting plan in form of workpiece geometry data 8A.

Usually, an order of a customer includes a group of workpieces, whereby an order includes further information on the individual workpieces, for example the required number of a type of a workpiece and possibly further subsequent processing steps for a workpiece. Accordingly, such workpiece-specific order data 8B are stored as characteristic data in the processing plan 7. In addition, workpiece image data 10 can be stored for the individual workpiece types or, if needed, workpiece image data 10 can generated from the workpiece geometry data 8A.

Usually, after the cutting process, the cut workpieces are still given in the form of the original flat material as cut material in the machine tool on the pallet as a (now cut) sheet and are accordingly arranged in a plate-like manner relative to each other. The workpieces are surrounded by a so-called residual grid, i.e., the material of the sheet that could not be used for workpieces. Some of the workpieces are still connected to the residual grid via so-called microjoints, e.g., to prevent the workpieces from tilting during transport on the conveyor belt.

The cut material is repositioned by machine or manually from the pallet to a conveyor system and fed to further processing steps. Thereby, the cut material maintains preferably its plate-like arrangement.

FIG. 1 schematically shows a conveyor system 9. The conveyor system comprises a circulating conveyor belt 9A, on which cut workpieces 13A, 13B, 13C as cut material 11 are indicated within a residual grid 23. The workpieces 13A, 13B, 13C are still given in the plate-like arrangement and are transported to a sorting point 21. Typically, a light barrier ensures that the workpieces 13A, 13B, 13C are not guided beyond the turning point of the circulating belt 9A. In addition, the drive of the conveyor belt 9A can be controlled manually by a worker 31 via a switch 9B.

The foremost workpieces 13A, 13B, 13C of the plate-shaped arrangement are within reach of the worker 31, so that the worker has access to a limited number of workpieces, here the workpieces 13A of the first row, at the sorting point 21. The worker 31 can pick these workpieces 13A and sort them to deposit locations A, B, C, D, which are provided, for example, on a deposit surface of a transport carriage 33 and belong to corresponding orders and/or subsequent processing steps. Accordingly, the worker 31 picks up the workpieces 13A from the conveyor belt 9A, removes any microjoints and assigns the workpieces 13A to the respective orders. According to the orders, three of the workpieces 13A of the front row are to be positioned, for example, at the deposit location A and one at the deposit location B.

According to the concepts disclosed herein, the sorting process is supported by a display of a sequence of workpiece-illustrations and optionally order information to facilitate correct sorting and in particular to increase efficiency. For this purpose, one or more display units are provided that are clearly visible to the worker 31 from the sorting point 21. For example, in the arrangement of FIG. 1, a large monitor 15A is positioned above the conveyor belt 9A, preferably extending across the width of the conveyor belt 9A. Furthermore, a monitor 15B (possibly with touch input function) can be positioned in front of the worker 31 in extension of the conveying direction of the conveyor belt 9A below a clipboard or in addition to an intermediate deposition area. Alternatively or additionally, displays can be provided at the side of the conveyor belt, which can be movable, for example, and positioned close to the respective deposit locations.

Figure 2:
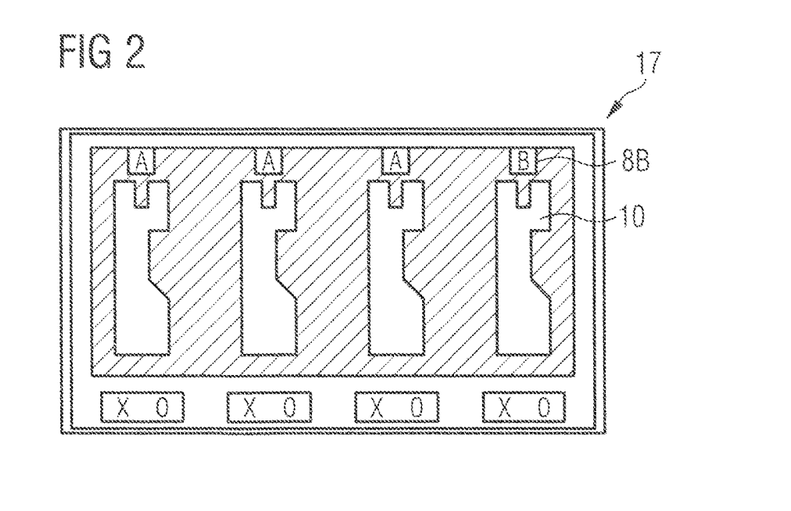
FIG. 2 is a sketch illustrating workpiece image data and order data on a monitor for supporting the sorting process.

In FIG. 1, it is indicated that the display units (monitor 15A, monitor 15B) are connected to the machine tool control system 5 for receiving image information via signal connections Sm. In particular, the display units each have a processor for receiving data to be output on the associated monitor 15A, 15B of the display unit. In FIG. 1, the foremost row of workpieces 13A, i.e., their workpiece image data 10, is schematically displayed on the monitors 15A, 15B. In FIG. 2, a monitor image 17 of the monitor 15A is shown. In addition to the displayed workpiece image data 10 of the workpieces 13A, the monitor image 17 shows order data 17 above each of the workpiece illustrations. By way of example, the three left workpieces 13A of the foremost row are assigned to an order whose workpieces are to be collected at deposit location "A". The right workpiece, on the other hand, is assigned to an order that is to be made available for the next processing step at deposit location "B".

In the event that the display is adapted as a touchscreen monitor (e.g., as monitor 15B in extension of the conveyor track), input fields can furthermore be provided, as exemplarily indicated in FIG. 2 under the workpieces illustrated. For example, an entry "X" or a marking as a scrap part "0" can be made. Details on the illustration of information on the displays (monitor 15A, 15B) are explained in connection with FIGS. 3 and 4A to 4C.

Furthermore, a signal connection Sf is provided between the machine tool control system 5 and the conveyor system 9. The signal connection allows, on the one hand, to control the drive of the conveyor system 9 and, on the other hand, to output the exact position information about the feed position (circulating position) of the conveyor belt 9A to the machine tool control system 5.

Figure 3:
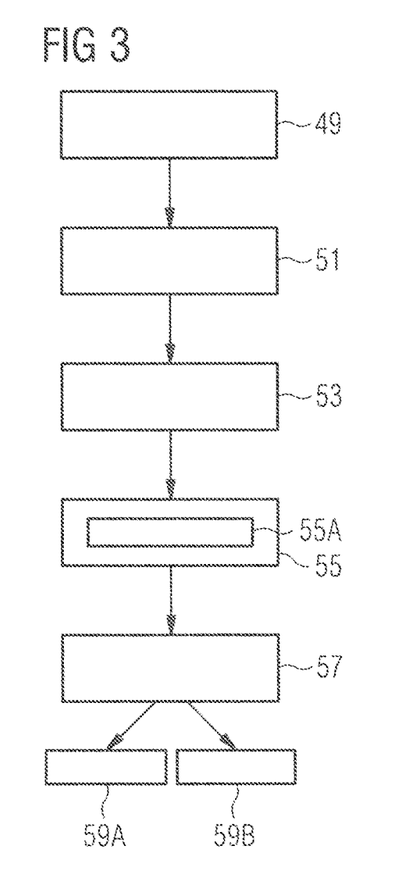
FIG. 3 is a flow diagram of an exemplary method for displaying a sequence of workpiece images and/or order data during the manufacturing of workpieces, the displaying supporting a sorting process, and FIGS. 4A to 4C provide exemplary illustrations of successive monitor images during a sorting process.

In the flow diagram of FIG. 3, the method is exemplarily divided into the following. In a step 51, manufactured workpieces 13A, 13B, 13C are transported to the sorting point 21 by the conveyor system 9. In this process, the sequence and arrangement of the workpieces on the conveyor belt 9A is given on the basis of the executed processing plan 7.

In a step 53, workpiece image data 10 and optionally order data 8B for the workpieces 13A, 13B, 13C provided by the machine tool control system 5 are received in the processor of a display unit, such as the monitor 15A.

In a step 55, the workpiece image data 10 and optionally the order data 8B are displayed on the monitor of the display unit in the sequence and optionally the arrangement such that the sequence and optionally the arrangement of the workpiece image data 10 and optionally the order data corresponds to the sequence and optionally the arrangement of the workpieces 13A, 13B, 13C that were transported by the conveyor system to the sorting point 21. In particular, there is displayed the workpiece image data of workpieces located in a sorting region 21 accessible to a worker 31, for example, in a transverse strip of the conveyor belt 9A in the region of the conveyor reversal. A transverse direction 19 is shown in FIG. 1. For this purpose, in a step 49 preceding step 51, for example, the workpieces 13A are determined that are positioned for sorting at the sorting point, i.e., accessible to the worker 31 from the sorting point 21. This is done with the inclusion of a cutting plan stored in the processing plan 7, which determines the arrangement of manufactured workpieces in the plate-shaped starting sheet. Further, the relative positions of workpieces 13A, 13B, 13C within the arrangement of manufactured workpieces may be included in the determination. Furthermore, in order to cor-rectly determine the respective workpieces 13A, 13B, 13C even during the sorting process, a feed value of the conveyor belt 9A (a feed status of the conveyor system) is included in the determination of the workpieces (workpieces 13A in FIG. 1) that are to be sorted next.

In the monitor image, the workpiece image data can be displayed with an orientation corresponding to the orientation in the cutting plan and at a position along the transverse direction 19 of the conveyor belt 9A as schematic workpiece-illustrations (step 55A). Also here, the processing plan 7 or the transport path of the workpieces already made by the conveyor system (the conveyor belt position) can be taken into account.

In some embodiments, the activation of the conveyor system by the worker 31 can be used to transport additional workpieces 13B to the sorting point 21. For this, for example, a new feed position of the conveyor belt 9A can be controlled manually. At the same time or subsequently, an automatic booking of those workpieces that should have been sorted from the conveyor belt can take place (step 57). I.e., the workpieces which were transported to the sorting point 21 at the previously assumed feed position (and thus lay within the reach of the worker 31) are registered (possibly even fully automatically) as booked. Under certain cir-cumstances, confirmation by the worker 31 may be required (step 59B).

The conveyor belt 9A can be controlled by the worker 31 in the feed; i.e., the worker 31 can stop the conveyor belt 9A and move workpieces step by step into the sorting area. Assuming a new feed position can be initiated automatically or manually by a worker 31. Automatically, this can occur, for example, when a light barrier at the end of the conveyor belt 9A is released due to the removal of the corresponding workpieces and the residual grid. Here, for example, a time delay of the release can be provided.

In addition, a verification of the automated booking of picked parts can be carried out by means of image acquisition of the removed parts and/or a residual grid or section of a residual grid in a step 59A. The image acquisition may further be configured to detect whether all workpieces in the area of the sorting point 21 have been sorted and assigned to deposit locations. If so, this can trigger a control of the conveyor system 9, which causes that further workpieces are transported to the sorting point 21.

Figure 4A:
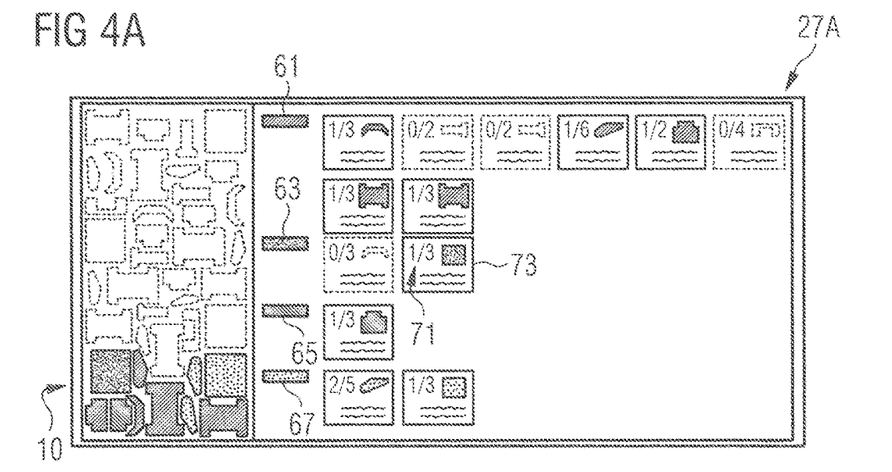
Figure 4B:
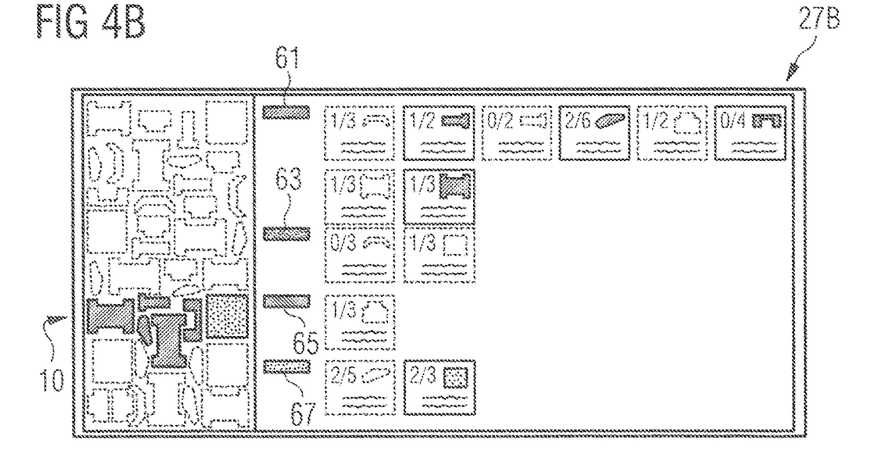
Figure 4C:
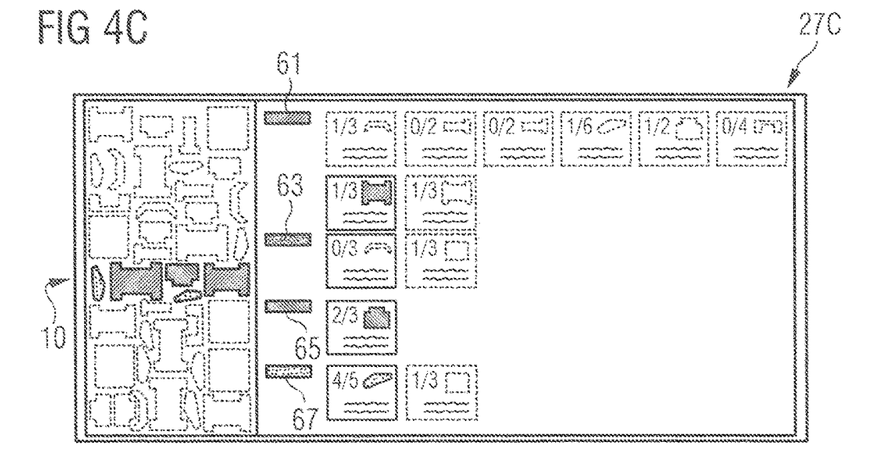

In FIGS. 4A to 4C, monitor images 27A, 27B, 27C corresponding to three successive steps of conveyor belt feed positions are shown. In the monitor images 27A, 27B, 27C, the workpiece image data 10 is shown as outlines of the respective workpieces to be sorted on the left side of the monitor images 27A, 27B, 27C. The workpiece image data of the workpieces not to be sorted may be only slightly displayed or not displayed at all. For example, the illustration corresponds to the arrangement and sequence of the cut workpieces as provided in the cutting plan and maintained during transportation by the conveyor system.

In addition, information about four subsequent processing steps and orders is displayed on the right side of monitor images 27A, 27B, 27C. The processing steps are, for example, 61 "Bending", 63 "Deburring", 65 "Welding", and 67 "Shipping". Exemplarily, in the monitor images 27A, 27B, 27C, the workpiece image data 10 for each subsequent processing step are listed side by side individually and are provided with characteristic data of the orders, e.g., with a required number 71 of workpieces (possibly in comparison with the number already sorted) and an order number 73.

In FIGS. 4A to 4C, the workpiece image data are marked with no or different fillings (hatching, dotting) to indicate the reference to the processing steps. This can also be done on the monitor, for example, by appropriate coloring.

In FIGS. 4A to 4C, those workpieces, which are within reach of the worker 31 at the respective time, are illustrated in a highlighted manner on the right side of the monitor images 27A, 27B, 27C. The workpieces not to be sorted at the respective time are shown only in-formatively, e.g., in pale colors or dashed.

Thus, for process step 61 "Bending" in FIG. 4A, workpiece image data can be seen for five types of workpieces that can be reached by worker 31. For the subsequent processing steps 63 "Deburring" and 65 "Welding", one workpiece is to be sorted in each case. For process step 67 "Shipping", two identical workpieces and one further workpiece are to be sorted.

When all workpieces have been released from the residual grid and removed from the conveyor belt, worker 31 can have the next group of workpieces conveyed to him. In this next feed position, four different types of workpieces are to be sorted for processing step 61 "Bending" and one workpiece for processing step 67 "Shipping".

Once these workpieces have been sorted and assigned to the corresponding deposit locations, the worker 31 will again activate the conveyor belt and now sort the next workpieces based on the workpiece image data shown in FIG. 4C.

In this way, information on the arrangements of workpieces produced according to the processing plans can be gradually output for the worker using the known positions of the workpieces, which are then sorted from the conveyor belt.

For the sake of completeness, it is pointed out that, alternatively or additionally, it can be indicated above respective workpieces how many of the type have already been sorted and how many of them are still missing. It is further noted that FIGS. 4A to 4C make it clear that the same types of cut workpieces may be assigned to different processing steps. If the worker 31 recognizes this, he can also deviate from the sorting plan as suggested by the machine tool control system and the worker can, for example, prefer to complete an order.

As described, the conveyor belt brings the workpieces displayed on the monitors within reach of the operator in this controlled manner. Furthermore, a group of workpieces to be sorted can already be assigned to a section of a residual grid in the processing plan. Such a section of a residual grid may have been separated from other sections of the residual grid by one or more subdivision cuts. For this group, a common feed position of the conveyor belt can be provided for the sorting process, in which the associated workpieces are located at the sorting point within the reach of the worker. In the processor of the display unit, the workpiece image data and optionally the order data for these workpieces can be transmitted and received together so that they are displayed accordingly on the monitor. Examples of such groups of workpieces are the workpieces shown in FIGS. 4A to 4C if a common residual grid section has been assigned to them.

In this case, a residual grid section will have a leading edge that can define the feed position of the conveyor belt for positioning the associated group of workpieces at the sorting point 21. For example, if a preceding section of a residual grid has been removed, the conveyor system may be activated until the conveyor belt is moved to the position where the leading edge triggers a light barrier, for example.

Furthermore, it is mentioned for completeness that in the sorting process the respective workpieces can, for example, be temporarily deposited on an intermediate deposit in order to then be brought together to the deposit location. The intermediate deposit can be, for example, an area on the deposition table shown at the reversal point or another type of collecting container or, in the case of large workpieces, separate pallets in each case. The residual grids can also be deposited accordingly on pallets or collecting containers.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for displaying a sequence of workpiece-illustrations for supporting a sorting process during manufacturing of workpieces with a manufacturing system, the manufacturing system including a machine tool control system in which workpiece image data associated with each of the workpieces are stored as part of a machine-readable processing plan, wherein for each workpiece, the workpiece image data include an illustration based on geometry data of the workpieces to be manufactured; a flatbed machine tool with which the workpieces are manufactured from a plate-shaped starting material according to the machine-readable processing plan T; a conveyor system that transports the workpieces as cut material to a sorting point for sorting the workpieces, the cut material being conveyed in a plate-like arrangement by the conveyor system; and a display unit with a processor for receiving data to be output on a monitor of the display unit, wherein the monitor is arranged in an area of the conveyor system, the method comprising:
   transporting, using the conveyor system, manufactured workpieces to the sorting point according to a sequence and arrangement specified by the processing plan;
   determining the manufactured workpieces positioned for sorting at the sorting point, taking into account a cutting plan stored in the processing plan and a feed value of a conveyor belt of the conveyor system;
   receiving, in the processor of the display unit, workpiece image data provided by the machine tool control system for the manufactured workpieces transported to the sorting point; and
   displaying the workpiece image data on the monitor of the display unit in a sequence and an arrangement such that the sequence and the arrangement of the workpiece image data correspond to the sequence and the arrangement of the workpieces transported from the conveyor system to the sorting point.

2. The method of claim 1, wherein the workpiece image data is displayed on the monitor as a monitor image that highlights partial workpiece-illustrations only of those workpieces that are located in an area that can be sorted by a worker.

3. The method of claim 2, wherein the area that can be sorted by the worker is a transverse strip of the conveyor belt in an area of a conveyor belt reversal.

4. The method of claim 1, wherein:
   the cutting plan determines the arrangement of manufactured workpieces in the plate-shaped starting material.

5. The method of claim 4, wherein taking into account the cutting plan stored in the processing plan includes taking into account relative positions of the workpieces within the arrangement of manufactured workpieces.

6. The method of claim 4, wherein the workpiece image data is displayed with an orientation and at a position along a transverse direction of the conveyor belt of the conveyor system as workpiece-illustrations, wherein the orientation and the position of one of the workpiece-illustrations is determined taking into account the processing plan.

7. The method of claim 4, wherein the workpiece image data is displayed with an orientation and at a position along a transverse direction of the conveyor belt of the conveyor system as workpiece-illustrations, wherein the orientation and the position of one of the workpiece-illustrations is determined taking into account a transport path provided by the conveyor system for the sorting point.

8. The method of claim 1, further comprising:
   automatically booking, in response to the conveyor system being activated to assume a new feed position of the conveyor belt of the conveyor system in order to transport further workpieces to the sorting point the further workpieces as having been sorted from the conveyor belt that had been transported to the sorting point at the previously assumed feed position.

9. The method of claim 8, wherein the activation of the conveyor system for assuming the new feed position is triggered automatically or is performed manually by a worker.

10. The method of claim 9, wherein the activation of the conveyor system for assuming the new feed position is triggered automatically by a delayed release of a light barrier at an end of the conveyor belt.

11. The method of claim 1, wherein, according to the processing plan, groups of workpieces to be sorted are generated, wherein a section of a residual grid surrounding the workpieces is associated to each of the groups and the workpieces to be sorted of a group are arranged within the respective section, and wherein successive sections of the residual grid are respectively separated from one another by a subdivision cut,
- wherein the workpieces of a group are transported to the sorting point with a common feed position of the conveyor belt of the conveyor system,
- the processor receives workpiece image data for the workpieces of the group, which was last transported to the sorting point, and
- the display unit displays the workpiece image data of the workpieces of the group, which was last transported to the sorting point.

12. The method of claim 11, wherein the section of the residual grid of a group has a leading edge that defines the feed position of the conveyor belt of the conveyor system for positioning the group at the sorting point,
- wherein the conveyor belt of the conveyor system is moved until it is detected that the leading edge of the section of the residual grid has assumed a predetermined conveying position.

13. The method of claim 1, further comprising:
- verifying of automated bookings of picked workpieces in the machine tool control system by image acquisition of the picked workpieces or a residual grid.

14. The method of claim 13, further comprising detecting that all workpieces in the area of the sorting point have been sorted, and controlling the conveyor system to transport further workpieces to the sorting point.

15. The method of claim 1, wherein order data associated with each of the workpieces is also stored in the machine tool control system as part of the machine-readable processing plan, the order data includes characteristic data of a manufacturing order associated with the workpiece, the method further comprising:
- receiving, in the processor of the display unit, order data provided by the machine tool control system for the manufactured workpieces transported to the sorting point; and
- displaying the order data on the monitor of the display unit in the sequence and the arrangement such that the sequence and the arrangement of the order data correspond to the sequence and the arrangement of the workpieces transported from the conveyor system to the sorting point.

16. A manufacturing system for manufacturing workpieces, the manufacturing system comprising:
- a machine tool control system in which workpiece image data associated with each of the workpieces to be manufactured are stored as part of a machine-readable processing plan, wherein, for each respective workpiece, the workpiece image data include a workpiece-illustration based on planning data of the workpieces;
- a flatbed machine tool configured to manufacture the workpieces from a plate-shaped starting material according to the machine-readable processing plan;
- a conveyor system configured to transport the workpieces as cut material to a sorting point for sorting the workpieces, the cut material being conveyed in a plate-like arrangement by the conveyor system; and
- a display unit with a processor configured to receive data to be output on a monitor of the display unit,
- wherein the monitor is arranged so as to be visible from the sorting point,
- wherein the processor is configured to receive workpiece image data provided by the machine tool control system for the workpieces transported to the sorting point,
- wherein the monitor is controllable such that the workpiece image data are displayed on the monitor in a sequence and in an arrangement such that the sequence and the arrangement of the workpiece image data correspond to a sequence and an arrangement of the workpieces transported by the conveyor system to the sorting point; and
- wherein the processor is configured to determine the workpieces positioned for sorting at the sorting point, taking into account a cutting plan stored in the processing plan and a feed value of a conveyor belt of the conveyor system.

17. The manufacturing system of claim 16, wherein:
the monitor is arranged in the region of the conveyor system.

18. The manufacturing system of claim 17, wherein the monitor is arranged above the conveyor belt.

19. The manufacturing system of claim 16, wherein the monitor includes one or more small screens below a reversal point of the conveyor belt in the area of the sorting point.

20. The manufacturing system of claim 16, wherein the display unit is configured as virtual reality glasses or as a heads-up display system.

* * * * *